(12) United States Patent
Kim et al.

(10) Patent No.: US 10,007,371 B2
(45) Date of Patent: *Jun. 26, 2018

(54) SMARTPHONE

(71) Applicant: HiDeep Inc., Gyeonggi-do (KR)

(72) Inventors: Seyeob Kim, Gyeonggi-do (KR);
Sangsic Yoon, Gyeonggi-do (KR);
Hojun Moon, Gyeonggi-do (KR);
Taehoon Kim, Gyeonggi-do (KR)

(73) Assignee: HIDEEP INC. (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/007,240

(22) Filed: Jan. 27, 2016

(65) Prior Publication Data

US 2016/0162088 A1 Jun. 9, 2016

Related U.S. Application Data

(63) Continuation of application No. 14/745,514, filed on Jun. 22, 2015.

(30) Foreign Application Priority Data

Aug. 1, 2014 (KR) .................. 10-2014-0098917

(51) Int. Cl.
*G06F 3/041* (2006.01)
*G06F 3/044* (2006.01)
*G06F 3/045* (2006.01)

(52) U.S. Cl.
CPC ............ *G06F 3/0412* (2013.01); *G06F 3/044* (2013.01); *G06F 3/045* (2013.01); *G06F 3/0414* (2013.01);

(Continued)

(58) Field of Classification Search
CPC .................. G06F 3/044; G06F 3/0414; G06F 2203/04105; G06F 2203/04101;

(Continued)

(56) References Cited

U.S. PATENT DOCUMENTS 5,510,813 A * 4/1996 Makinwa ............... G06F 3/041
341/33
2003/0007238 A1 1/2003 Liang et al.
(Continued)

FOREIGN PATENT DOCUMENTS

CN 103257779 8/2013
CN 203386194 1/2014
(Continued)

OTHER PUBLICATIONS

International Search Report for Corresponding Application No. PCT/KR2014/006907, dated Nov. 28, 2014.
(Continued)

*Primary Examiner* — Hong Zhou
(74) *Attorney, Agent, or Firm* — The Belles Group, P.C.

(57) ABSTRACT

A smartphone includes: a cover layer; a display module, and comprises a component configured to cause the LCD panel to perform a display function; a pressure electrode which is located under the display module; and a shielding member which is located under the pressure electrode. At least a portion of a touch sensor which senses touch in a capacitive manner is located in the display module.

14 Claims, 14 Drawing Sheets

(52) U.S. Cl.
CPC .. *G06F 3/0416* (2013.01); *G06F 2203/04101* (2013.01); *G06F 2203/04103* (2013.01); *G06F 2203/04104* (2013.01); *G06F 2203/04105* (2013.01); *G06F 2203/04107* (2013.01); *G06F 2203/04111* (2013.01)

(58) Field of Classification Search
CPC . G06F 2203/04103; G06F 2203/04104; G06F 2203/04107; G06F 2203/04111; G06F 3/0412; G06F 3/0416; G06F 3/045; H03K 17/975; G01L 1/142; G01L 5/165; G02B 26/0833
USPC .......................................... 345/169, 173–174
See application file for complete search history.

(56) References Cited

U.S. PATENT DOCUMENTS

| | | | |
|---|---|---|---|
| 2004/0227736 | A1 | 11/2004 | Kamrath et al. |
| 2008/0062139 | A1 | 3/2008 | Hotelling et al. |
| 2008/0062140 | A1 | 3/2008 | Hotelling et al. |
| 2008/0202251 | A1 | 8/2008 | Serban |
| 2010/0024573 | A1 | 2/2010 | Daverman et al. |
| 2010/0033354 | A1 | 2/2010 | Ejlersen |
| 2010/0123672 | A1* | 5/2010 | Kim .................. G06F 3/045 345/173 |
| 2010/0309030 | A1 | 12/2010 | Huang et al. |
| 2010/0321609 | A1 | 12/2010 | Qi et al. |
| 2011/0023634 | A1 | 2/2011 | Sleeman |
| 2011/0037726 | A1 | 2/2011 | Lee |
| 2011/0115738 | A1 | 5/2011 | Suzuki et al. |
| 2011/0126900 | A1 | 6/2011 | Inoue et al. |
| 2011/0157087 | A1 | 6/2011 | Kanehira et al. |
| 2011/0175845 | A1 | 7/2011 | Honda et al. |
| 2012/0038583 | A1 | 2/2012 | Westhues et al. |
| 2012/0050195 | A1 | 3/2012 | Heo et al. |
| 2012/0068965 | A1 | 3/2012 | Wada et al. |
| 2012/0105340 | A1 | 5/2012 | Beom et al. |
| 2012/0113361 | A1* | 5/2012 | Huang ................ G06F 3/041 349/96 |
| 2012/0127095 | A1 | 5/2012 | Jun |
| 2012/0180575 | A1 | 7/2012 | Sakano et al. |
| 2013/0016060 | A1 | 1/2013 | Pereverzev et al. |
| 2013/0018059 | A1 | 1/2013 | Lowles et al. |
| 2013/0033450 | A1 | 2/2013 | Coulson et al. |
| 2013/0234734 | A1 | 9/2013 | Iida et al. |
| 2013/0257784 | A1 | 10/2013 | Vandermeijden et al. |
| 2014/0002113 | A1 | 1/2014 | Schediwy et al. |
| 2014/0049506 | A1 | 2/2014 | Lin |
| 2014/0062934 | A1 | 3/2014 | Coulson et al. |
| 2014/0078080 | A1 | 3/2014 | Kim et al. |
| 2014/0204049 | A1 | 7/2014 | Tsai et al. |
| 2014/0210791 | A1 | 7/2014 | Hanauer et al. |
| 2014/0267128 | A1 | 9/2014 | Bulea et al. |
| 2014/0307186 | A1 | 10/2014 | Yun et al. |
| 2015/0168767 | A1 | 6/2015 | Yonemura |
| 2015/0169121 | A1 | 6/2015 | Yao et al. |
| 2015/0212633 | A1 | 7/2015 | Yamagishi et al. |
| 2015/0235607 | A1 | 8/2015 | Nakanishi et al. |
| 2015/0370373 | A1 | 12/2015 | Barel |
| 2016/0034087 | A1 | 2/2016 | Kim et al. |
| 2016/0035290 | A1 | 2/2016 | Kim et al. |
| 2016/0062500 | A1 | 3/2016 | Kessler et al. |
| 2016/0085336 | A1 | 3/2016 | Kim et al. |
| 2016/0088133 | A1 | 3/2016 | Kim et al. |
| 2016/0209984 | A1* | 7/2016 | Richards ............... G06F 3/0418 |

FOREIGN PATENT DOCUMENTS

| | | |
|---|---|---|
| JP | 2007322587 | 12/2007 |
| JP | 2009163363 | 7/2009 |
| JP | 2010244514 | 10/2010 |
| JP | 2011081578 | 4/2011 |
| JP | 2011086191 | 4/2011 |
| JP | 2011258043 | 12/2011 |
| JP | 2012235224 | 11/2012 |
| JP | 2013088932 | 5/2013 |
| JP | 2013105154 | 5/2013 |
| JP | 2013242770 | 12/2013 |
| JP | 2014194591 | 10/2014 |
| JP | 5798700 | 10/2015 |
| KR | 200900776126 | 7/2009 |
| KR | 20100025176 | 3/2010 |
| KR | 20110039304 | 4/2011 |
| KR | 1033154 | 5/2011 |
| KR | 1020110128724 | 11/2011 |
| KR | 20120053716 | 5/2012 |
| KR | 20120139518 | 12/2012 |
| KR | 101311235 | 9/2013 |
| KR | 1020130127176 | 11/2013 |
| KR | 20130131647 | 12/2013 |
| KR | 1020140096905 | 8/2014 |
| KR | 20150011271 | 1/2015 |
| KR | 101506511 | 7/2015 |
| WO | 2011013588 | 2/2011 |
| WO | WO2011111906 | 9/2011 |
| WO | WO2014017248 | 1/2014 |
| WO | 2014080924 | 5/2014 |
| WO | WO2015106183 | 7/2015 |

OTHER PUBLICATIONS

Corresponding Search Report Issued by the EPO dated Aug. 27, 2015.
Corresponding Office Action Issued by the KIPO dated Oct. 19, 2015.
Corresponding Office Action Issued by the JPO dated Jul. 14, 2015.
Corresponding Office Action Issued by the KIPO dated Sep. 30, 2015.
Corresponding Office Action Issued by the JPO dated Jul. 28, 2015.
Corresponding Office Action Issued by the KIPO dated Sep. 23, 2015.
Corresponding Office Action Issued by JPO dated Aug. 25, 2015.
Corresponding U.S. Appl. No. 14/992,568, filed Jan. 11, 2016.
Corresponding U.S. Appl. No. 15/009,951, filed Jan. 29, 2016.
Corresponding U.S. Appl. No. 14/992,668, filed Jan. 11 2016.
Corresponding U.S. Appl. No. 15/007,245, filed Jan. 27, 2016.
Corresponding U.S. Appl. No. 15/009,973, filed Jan. 29, 2016.
Corresponding U.S. Appl. No. 14/820,942, filed Aug. 7, 2015.
Corresponding U.S. Appl. No. 14/908,706, filed Jan. 29, 2016.
Corresponding U.S. Appl. No. 15/071,561, filed Mar. 16, 2016.
Final Office Action dated Mar. 26, 2018 in Corresponding U.S. Appl. No. 14/908,706.

* cited by examiner

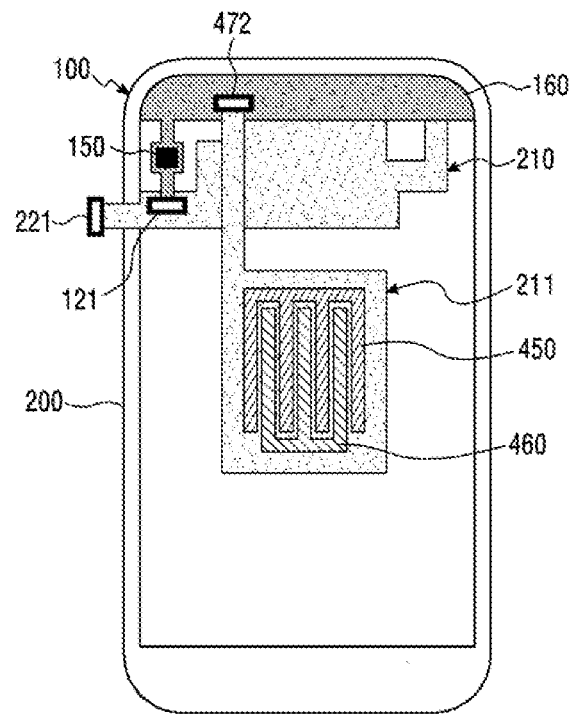
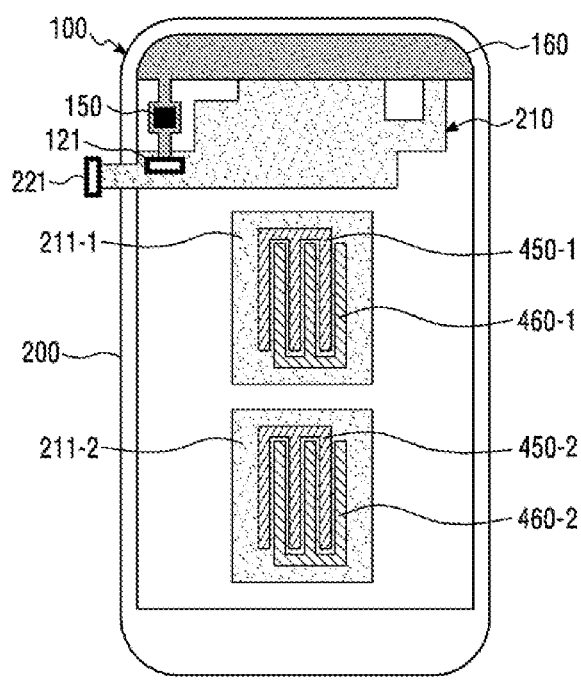

SMARTPHONE

CROSS REFERENCE TO RELATED APPLICATIONS

Priority is claimed as a continuation application to U.S. patent application Ser. No. 14/745,514, filed Jun. 22, 2015, which claims priority under 35 U.S.C. § 119 to Korean Patent Application No. 10-2014-0098917, filed Aug. 1, 2014, the disclosures of which are incorporated herein by reference in their entireties.

FIELD OF THE INVENTION

The present invention relates to a smartphone, and more particularly to a smartphone which includes a display module and is configured to detect a touch position and the magnitude of a touch pressure.

BACKGROUND OF THE INVENTION

Various kinds of input devices are being used to operate a computing system. For example, the input device includes a button, key, joystick and touch screen. Since the touch screen is easy and simple to operate, the touch screen is increasingly being used in operation of the computing system.

The touch screen may constitute a touch surface of a touch input device including a touch sensor panel which may be a transparent panel including a touch-sensitive surface. The touch sensor panel is attached to the front side of a display screen, and then the touch-sensitive surface may cover the visible side of the display screen. The touch screen allows a user to operate the computing system by simply touching the touch screen by a finger, etc. Generally, the computing system recognizes the touch and the touch position on the touch screen and analyzes the touch, and thus, performs the operations in accordance with the analysis.

Here, there is a demand for a touch input device capable of detecting not only the touch position according to the touch on the touch screen but the magnitude of the touch pressure without degrading the performance of the display module.

SUMMARY OF THE INVENTION

One embodiment is a smartphone. The smartphone includes: a cover layer; a display module which is located under the cover layer and comprises an LCD panel comprising a liquid crystal layer, and a first glass layer and a second glass layer between which the liquid crystal layer is placed, and comprises a component configured to cause the LCD panel to perform a display function; a pressure electrode which is located under the display module; and a shielding member which is located under the pressure electrode. At least a portion of a touch sensor which senses touch in a capacitive manner is located between the first glass layer and the second glass layer. The touch sensor comprises a plurality of drive electrodes and a plurality of receiving electrodes. A drive signal is applied to the touch sensor and a touch position is detected by a sensing signal which is outputted from the touch sensor. A magnitude of a touch pressure is detected based on a capacitance change amount outputted from the pressure electrode.

Another embodiment is a smartphone including: a cover layer; a display module which is located under the cover layer and comprises an LCD panel comprising a liquid crystal layer, and a first glass layer and a second glass layer between which the liquid crystal layer is placed, and comprises a component configured to cause the LCD panel to perform a display function; a pressure electrode which is located under the display module; and a shielding member which is located under the pressure electrode. At least a portion of a touch sensor which senses touch in a capacitive manner is located between the first glass layer and the second glass layer. The touch sensor comprises a plurality of drive electrodes and a plurality of receiving electrodes. The smartphone further includes a drive unit which applies a drive signal to the touch sensor; a sensing unit which receives a sensing signal from the touch sensor and detects a touch position; and a pressure detector which detects a magnitude of a touch pressure based on a capacitance change amount outputted from the pressure electrode.

Further another is a smartphone including: a cover layer; a display module which is located under the cover layer and comprises an LCD panel comprising a liquid crystal layer, and a first glass layer and a second glass layer between which the liquid crystal layer is placed, and comprises a component configured to cause the LCD panel to perform a display function; a pressure electrode which is located under the display module; and a reference potential layer spaced from the pressure electrode. At least a portion of a touch sensor which senses touch in a capacitive manner is located between the first glass layer and the second glass layer. The touch sensor comprises a plurality of drive electrodes and a plurality of receiving electrodes. A drive signal is applied to the touch sensor and a touch position is detected by a sensing signal which is outputted from the touch sensor. A magnitude of a touch pressure is detected based on a capacitance change amount outputted from the pressure electrode. The capacitance change amount is changed according to a distance between the pressure electrode and the reference potential layer.

BRIEF DESCRIPTION OF THE DRAWINGS

FIG. 6b is a cross sectional view showing a case where a pressure has been applied to the touch input device shown in FIG. 6a;

FIGS. 10a to 10c show how the pressure electrode is connected to a touch sensing circuit in accordance with the second embodiment of the present invention;

FIGS. 11a to 11c show that the pressure electrode constitutes a plurality of channels in accordance with the embodiment of the present invention.

DETAILED DESCRIPTION OF THE INVENTION

Figure 1:
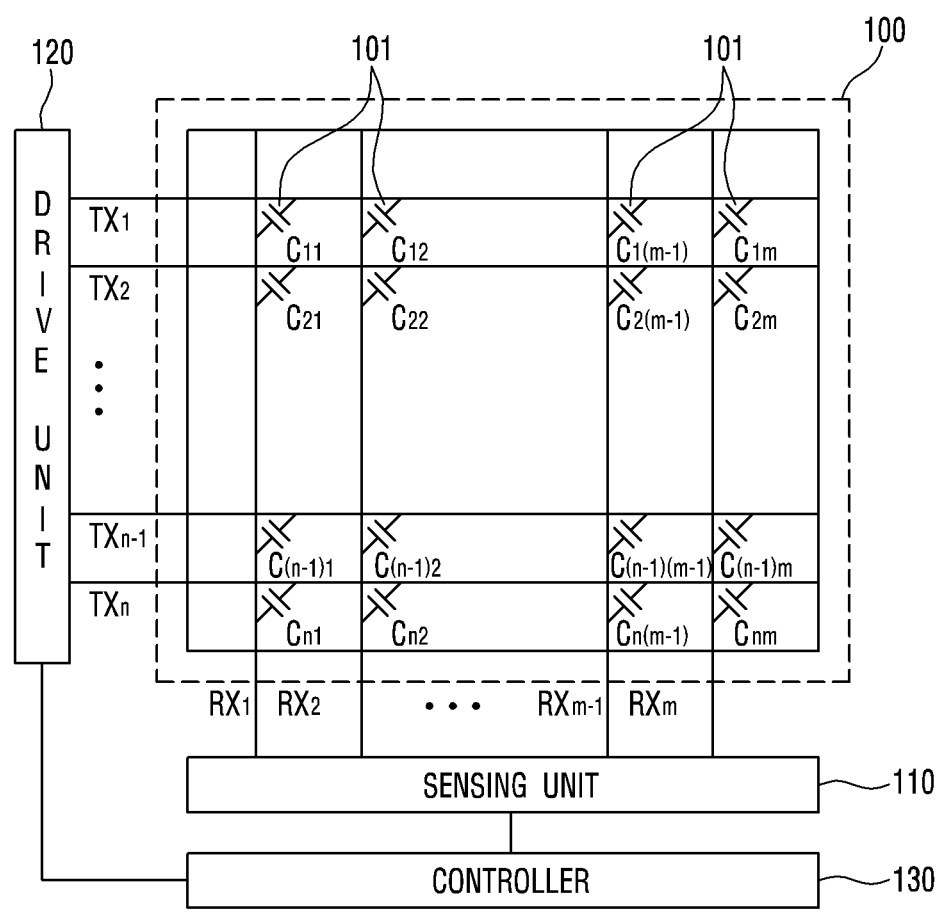
FIG. 1 is a schematic view of a configuration of a capacitance type touch sensor panel and the operation thereof in accordance with an embodiment of the present invention.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

A touch input device according to an embodiment of the present invention will be described with reference to the accompanying drawings. While a capacitance type touch sensor panel 100 and a pressure detection module 400 are described below, the touch sensor panel 100 and the pressure detection module 400 may be adopted, which are capable of detecting a touch position and/or touch pressure by any method.

FIG. 1 is a schematic view of a configuration of the capacitance touch sensor panel 100 and the operation thereof in accordance with the embodiment of the present invention. Referring to FIG. 1, the touch sensor panel 100 according to the embodiment of the present invention may include a plurality of drive electrodes TX1 to TXn and a plurality of receiving electrodes RX1 to RXm, and may include a drive unit 120 which applies a driving signal to the plurality of drive electrodes TX1 to TXn for the purpose of the operation of the touch sensor panel 100, and a sensing unit 110 which detects the touch and the touch position by receiving a sensing signal including information on the capacitance change amount changing according to the touch on the touch surface of the touch sensor panel 100.

As shown in FIG. 1, the touch sensor panel 100 may include the plurality of drive electrodes TX1 to TXn and the plurality of receiving electrodes RX1 to RXm. While FIG. 1 shows that the plurality of drive electrodes TX1 to TXn and the plurality of receiving electrodes RX1 to RXm of the touch sensor panel 100 form an orthogonal array, the present invention is not limited to this. The plurality of drive electrodes TX1 to TXn and the plurality of receiving electrodes RX1 to RXm has an array of arbitrary dimension, for example, a diagonal array, a concentric array, a 3-dimensional random array, etc., and an array obtained by the application of them. Here, "n" and "m" are positive integers and may be the same as each other or may have different values. The magnitude of the value may be changed depending on the embodiment.

As shown in FIG. 1, the plurality of drive electrodes TX1 to TXn and the plurality of receiving electrodes RX1 to RXm may be arranged to cross each other. The drive electrode TX may include the plurality of drive electrodes TX1 to TXn extending in a first axial direction. The receiving electrode RX may include the plurality of receiving electrodes RX1 to RXm extending in a second axial direction crossing the first axial direction.

In the touch sensor panel 100 according to the embodiment of the present invention, the plurality of drive electrodes TX1 to TXn and the plurality of receiving electrodes RX1 to RXm may be formed in the same layer. For example, the plurality of drive electrodes TX1 to TXn and the plurality of receiving electrodes RX1 to RXm may be formed on the same side of an insulation layer (not shown). Also, the plurality of drive electrodes TX1 to TXn and the plurality of receiving electrodes RX1 to RXm may be formed in the different layers. For example, the plurality of drive electrodes TX1 to TXn and the plurality of receiving electrodes RX1 to RXm may be formed on both sides of one insulation layer (not shown) respectively, or the plurality of drive electrodes TX1 to TXn may be formed on a side of a first insulation layer (not shown) and the plurality of receiving electrodes RX1 to RXm may be formed on a side of a second insulation layer (not shown) different from the first insulation layer.

The plurality of drive electrodes TX1 to TXn and the plurality of receiving electrodes RX1 to RXm may be made of a transparent conductive material (for example, indium tin oxide (ITO) or antimony tin oxide (ATO) which is made of tin oxide ($SnO_2$), and indium oxide ($In_2O_3$), etc.), or the like. However, this is only an example. The drive electrode TX and the receiving electrode RX may be also made of another transparent conductive material or an opaque conductive material. For instance, the drive electrode TX and the receiving electrode RX may be formed to include at least any one of silver ink, copper or carbon nanotube (CNT). Also, the drive electrode TX and the receiving electrode RX may be made of metal mesh or nano silver.

The drive unit 120 according to the embodiment of the present invention may apply a driving signal to the drive electrodes TX1 to TXn. In the embodiment of the present invention, one driving signal may be sequentially applied at a time to the first drive electrode TX1 to the n-th drive electrode TXn. The driving signal may be applied again repeatedly. This is only an example. The driving signal may be applied to the plurality of drive electrodes at the same time in accordance with the embodiment.

Through the receiving electrodes RX1 to RXm, the sensing unit 110 receives the sensing signal including information on a capacitance (Cm) 101 generated between the receiving electrodes RX1 to RXm and the drive electrodes TX1 to TXn to which the driving signal has been applied, thereby detecting whether or not the touch has occurred and where the touch has occurred. For example, the sensing signal may be a signal coupled by the capacitance (CM) 101 generated between the receiving electrode RX and the drive electrode TX to which the driving signal has been applied. As such, the process of sensing the driving signal applied from the first drive electrode TX1 to the n-th drive electrode TXn through the receiving electrodes RX1 to RXm can be referred to as a process of scanning the touch sensor panel 100.

For example, the sensing unit 110 may include a receiver (not shown) which is connected to each of the receiving electrodes RX1 to RXm through a switch. The switch becomes the on-state in a time interval during which the signal of the corresponding receiving electrode RX is sensed, thereby allowing the receiver to sense the sensing signal from the receiving electrode RX. The receiver may include an amplifier (not shown) and a feedback capacitor coupled between the negative (−) input terminal of the amplifier and the output terminal of the amplifier, i.e., coupled to a feedback path. Here, the positive (+) input terminal of the amplifier may be connected to the ground. Also, the receiver may further include a reset switch which is connected in parallel with the feedback capacitor. The reset switch may reset the conversion from current to voltage that is performed by the receiver. The negative input terminal of the amplifier is connected to the corresponding receiving electrode RX and receives and integrates a current signal including information on the capacitance (CM) 101, and then converts the integrated current signal into voltage. The sensing unit 110 may further include an analog to digital converter (ADC) (not shown) which converts the integrated data by the receiver into digital data. Later, the digital data may be input to a processor (not shown) and processed to obtain information on the touch on the touch sensor panel 100. The sensing unit 110 may include the ADC and processor as well as the receiver.

A controller 130 may perform a function of controlling the operations of the drive unit 120 and the sensing unit 110. For example, the controller 130 generates and transmits a drive control signal to the drive unit 120, so that the driving signal can be applied to a predetermined drive electrode TX1 at a predetermined time. Also, the controller 130 generates and transmits the drive control signal to the sensing unit 110, so that the sensing unit 110 may receive the sensing signal from the predetermined receiving electrode RX at a predetermined time and perform a predetermined function.

In FIG. 1, the drive unit 120 and the sensing unit 110 may constitute a touch detection device (not shown) capable of detecting whether the touch has occurred on the touch sensor panel 100 according to the embodiment of the present invention or not and where the touch has occurred. The touch detection device according to the embodiment of the present invention may further include the controller 130. The touch detection device according to the embodiment of the present invention may be integrated and implemented on a touch sensing integrated circuit (IC, see reference numeral 150 of FIG. 10) in a touch input device 1000 including the touch sensor panel 100. The drive electrode TX and the receiving electrode RX included in the touch sensor panel 100 may be connected to the drive unit 120 and the sensing unit 110 included in the touch sensing IC 150 through, for example, a conductive trace and/or a conductive pattern printed on a circuit board, or the like. The touch sensing IC 150 may be located on a circuit board on which the conductive pattern has been printed, for example, a first printed circuit board (hereafter, referred to as a first PCB) indicated by a reference numeral 160 of FIG. 10. According to the embodiment, the touch sensing IC 150 may be mounted on a main board for operation of the touch input device 1000.

As described above, a capacitance (C) with a predetermined value is generated at each crossing of the drive electrode TX and the receiving electrode RX. When an object like a finger approaches close to the touch sensor panel 100, the value of the capacitance may be changed. In FIG. 1, the capacitance may represent a mutual capacitance (Cm). The sensing unit 110 senses such electrical characteristics, thereby being able to sense whether the touch has occurred on the touch sensor panel 100 or not and where the touch has occurred. For example, the sensing unit 110 is able to sense whether the touch has occurred on the surface of the touch sensor panel 100 comprised of a two-dimensional plane consisting of a first axis and a second axis.

More specifically, when the touch occurs on the touch sensor panel 100, the drive electrode TX to which the driving signal has been applied is detected, so that the position of the second axial direction of the touch can be detected. Likewise, when the touch occurs on the touch sensor panel 100, the capacitance change is detected from the reception signal received through the receiving electrode RX, so that the position of the first axial direction of the touch can be detected.

The mutual capacitance type touch sensor panel as the touch sensor panel 100 has been described in detail in the foregoing. However, in the touch input device 1000 according to the embodiment of the present invention, the touch sensor panel 100 for detecting whether or not the touch has occurred and where the touch has occurred may be implemented by using not only the above-described method but also any touch sensing method like a self-capacitance type method, a surface capacitance type method, a projected capacitance type method, a resistance film method, a surface acoustic wave (SAW) method, an infrared method, an optical imaging method, a dispersive signal technology, and an acoustic pulse recognition method, etc.

The touch sensor panel 100 for detecting where the touch has occurred in the touch input device 1000 according to the embodiment of the present invention may be positioned outside or inside a display module 200.

The display module of the touch input device 1000 according to the embodiment of the present invention may be a display panel included in a liquid crystal display (LCD), a plasma display panel (PDP), an organic light emitting diode (OLED), etc. Accordingly, a user may perform the input operation by touching the touch surface while visually identifying an image displayed on the display panel. Here, the display module 200 may include a control circuit which receives an input from an application processor (AP) or a central processing unit (CPU) on a main board for the operation of the touch input device 1000 and displays the contents that the user wants on the display panel. The control circuit may be mounted on a second printed circuit board (hereafter, referred to as a second PCB) (210) in FIGS. 8*a* to 9*c*. Here, the control circuit for the operation of the display module 200 may include a display panel control IC, a graphic controller IC, and a circuit required to operate other display panels 200.

Figure 2A:
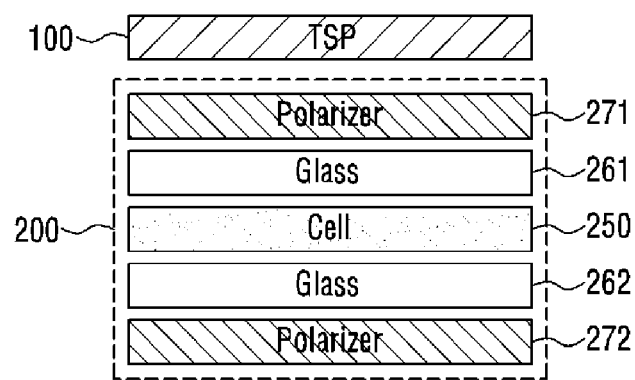
FIGS. 2a, 2b and 2c are conceptual views showing a relative position of the touch sensor panel with respect to a display module in a touch input device according to the embodiment of the present invention.
Figure 2B:
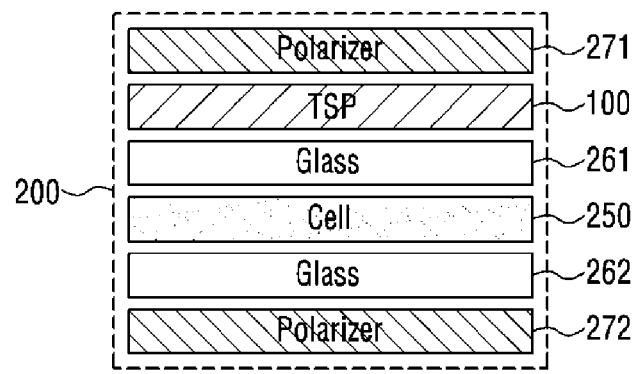
Figure 2C:
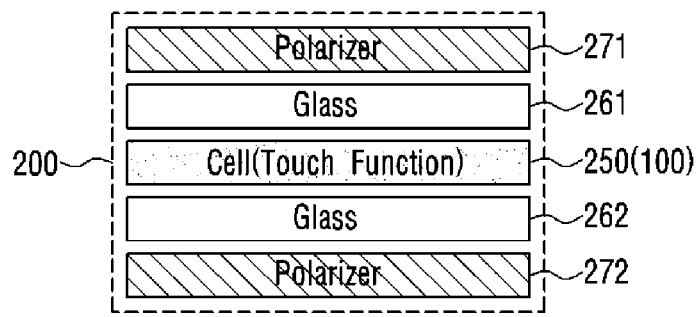

FIGS. 2a, 2b and 2c are conceptual views showing a relative position of the touch sensor panel with respect to the display module in the touch input device according to the embodiment of the present invention. While FIGS. 2a to 2c show an LCD panel as a display panel, this is just an example. Any display panel may be applied to the touch input device 1000 according to the embodiment of the present invention.

In this specification, the reference numeral 200 designates the display panel. Also, in FIG. 2 and the description of FIG. 2, the reference numeral 200 may designate not only the display module but also the display panel. As shown in FIG. 2, the LCD panel may include a liquid crystal layer 250 including a liquid crystal cell, a first glass layer 261 and a second glass layer 262 which are disposed on both sides of the liquid crystal layer 250 and include electrodes, a first polarizer layer 271 formed on a side of the first glass layer 261 in a direction facing the liquid crystal layer 250, and a second polarizer layer 272 formed on a side of the second glass layer 262 in the direction facing the liquid crystal layer 250. It is clear to those skilled in the art that the LCD panel may further include other configurations for the purpose of performing the displaying function and may be transformed.

FIG. 2a shows that the touch sensor panel 100 of the touch input device 1000 is disposed outside the display module 200. The touch surface of the touch input device 1000 may be the surface of the touch sensor panel 100. In FIG. 2a, the top surface of the touch sensor panel 100 is able to function as the touch surface. Also, according to the embodiment, the touch surface of the touch input device 1000 may be the outer surface of the display module 200. In FIG. 2a, the bottom surface of the second polarizer layer 272 of the display module 200 is able to function as the touch surface. Here, in order to protect the display module 200, the bottom surface of the display module 200 may be covered with a cover layer (not shown) like glass.

FIGS. 2b and 2c show that the touch sensor panel 100 of the touch input device 1000 is disposed inside the display panel 200. Here, in FIG. 2b, the touch sensor panel 100 for detecting the touch position is disposed between the first glass layer 261 and the first polarizer layer 271. Here, the touch surface of the touch input device 1000 is the outer surface of the display module 200. The top surface or bottom surface of the display module 200 in FIG. 2b may be the touch surface. FIG. 2c shows that the touch sensor panel 100 for detecting the touch position is included in the liquid crystal layer 250. Here, the touch surface of the touch input device 1000 is the outer surface of the display module 200. The top surface or bottom surface of the display module 200 in FIG. 2c may be the touch surface. In FIGS. 2b and 2c, the top surface or bottom surface of the display module 200, which can be the touch surface, may be covered with a cover layer (not shown) like glass.

The foregoing has described whether the touch has occurred on the touch sensor panel 100 according to the embodiment of the present or not and where the touch has occurred. Further, through use of the touch sensor panel 100 according to the embodiment of the present, it is possible to detect the magnitude of the touch pressure as well as whether the touch has occurred or not and where the touch has occurred. Also, apart from the touch sensor panel 100, it is possible to detect the magnitude of the touch pressure by further including the pressure detection module which detects the touch pressure.

Figure 3:
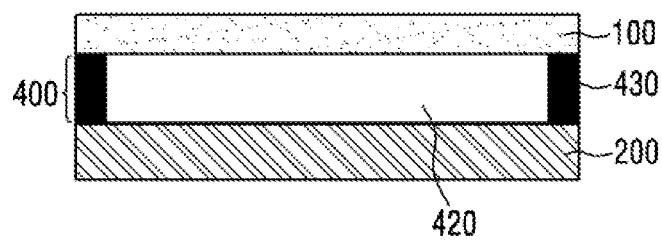
FIG. 3 is a cross sectional view of the touch input device configured to detect the touch position and touch pressure in accordance with a first embodiment of the present invention.

FIG. 3 is a cross sectional view of the touch input device configured to detect the touch position and touch pressure in accordance with a first embodiment of the present invention.

In the touch input device 1000 including the display module 200, the touch sensor panel 100 and the pressure detection module 400 which detect the touch position may be attached on the front side of the display module 200, As a result, the display screen of the display module 200 can be protected and the touch detection sensitivity of the touch sensor panel 100 can be improved.

Here, the pressure detection module 400 may be operated apart from the touch sensor panel 100 which detects the touch position. For example, the pressure detection module 400 may be configured to detect only the touch pressure independently of the touch sensor panel 100 which detects the touch position. Also, the pressure detection module 400 may be configured to be coupled to the touch sensor panel 100 which detects the touch position and to detect the touch pressure. For example, at least one of the drive electrode TX and the receiving electrode RX included in the touch sensor panel 100 which detects the touch position may be used to detect the touch pressure.

FIG. 3 shows that the pressure detection module 400 is coupled to the touch sensor panel 100 and detects the touch pressure. In FIG. 2, the pressure detection module 400 includes a spacer layer 420 which leaves a space between the touch sensor panel 100 and the display module 200. The pressure detection module 400 may include a reference potential layer spaced from the touch sensor panel 100 by the spacer layer 420. Here, the display module 200 may function as the reference potential layer.

The reference potential layer may have any potential which causes the change of the capacitance 101 generated between the drive electrode TX and the receiving electrode RX. For instance, the reference potential layer may be a ground layer having a ground potential. The reference potential layer may be the ground layer of the display module 200. Here, the reference potential layer may have a parallel plane with the two-dimensional plane of the display module 200.

As shown in FIG. 3, the touch sensor panel 100 is disposed apart from the display module 200, i.e., the reference potential layer. Here, depending on a method for adhering the touch sensor panel 100 to the display module 200, the spacer layer 420 may be implemented in the form of an air gap between the touch sensor panel 100 and the display module 200.

Here, a double adhesive tape (DAT) 430 may be used to fix the touch sensor panel 100 and the display module 200. For example, the areas the touch sensor panel 100 and the display module 200 are overlapped with each other. The touch sensor panel 100 and the display module 200 are adhered to each other by adhering the edge portions of the touch sensor panel 100 and the display module 200 through use of the DAT 430. The rest portions of the touch sensor panel 100 and the display module 200 may be spaced apart from each other by a predetermined distance "d".

In general, even when the touch surface is touched without bending the touch sensor panel 100, the capacitance (Cm) 101 between the drive electrode TX and the receiving electrode RX is changed. That is, when the touch occurs on the touch sensor panel 100, the mutual capacitance (Cm) 101 may become smaller than a base mutual capacitance. This is because, when the conductive object like a finger approaches close to the touch sensor panel 100, the object functions as the ground GND, and then a fringing capacitance of the mutual capacitance (Cm) 101 is absorbed in the object. The base mutual capacitance is the value of the mutual capacitance between the drive electrode TX and the receiving electrode RX when there is no touch on the touch sensor panel 100.

When the object touches the top surface, i.e., the touch surface of the touch sensor panel 100 and a pressure is applied to the top surface, the touch sensor panel 100 may be bent. Here, the value of the mutual capacitance (Cm) 101 between the drive electrode TX and the receiving electrode RX may be more reduced. This is because the bend of the touch sensor panel 100 causes the distance between the touch sensor panel 100 and the reference potential layer to be reduced from "d" to "d'", so that the fringing capacitance of the mutual capacitance (Cm) 101 is absorbed in the reference potential layer as well as in the object. When a nonconductive object touches, the change of the mutual capacitance (Cm) 101 is simply caused by only the change of the distance "d-d'" between the touch sensor panel 100 and the reference potential layer.

As described above, the touch input device 1000 is configured to include the touch sensor panel 100 and the pressure detection module 400 on the display module 200, so that not only the touch position but also the touch pressure can be simultaneously detected.

However, as shown in FIG. 3, when the pressure detection module 400 as well as the touch sensor panel 100 is disposed on the display module 200, the display properties of the display module is deteriorated. Particularly, when the air gap 420 is included on the display module 200, the visibility and optical transmittance of the display module may be lowered.

Accordingly, in order to prevent such problems, the air gap is not disposed between the display module 200 and the touch sensor panel 100 for detecting the touch position. Instead, the touch sensor panel 100 and the display module 200 can be completely laminated by means of an adhesive like an optically clear adhesive (OCA).

Figure 4:
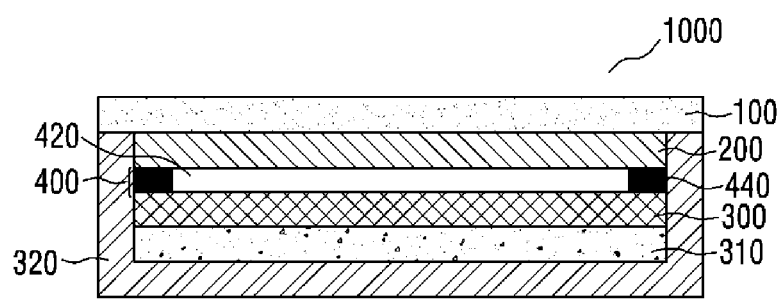
FIG. 4 is a cross sectional view of a touch input device according to a second embodiment of the present invention.

FIG. 4 is a cross sectional view of the touch input device according to a second embodiment of the present invention. In the touch input device 1000 according to the second embodiment of the present invention, the complete lamination is made by an adhesive between the touch sensor panel 100 and the display module 200 for detecting the touch position. As a result, the display color clarity, visibility and optical transmittance of the display module 200, which can be recognized through the touch surface of the touch sensor panel 100, can be improved.

Figure 5:
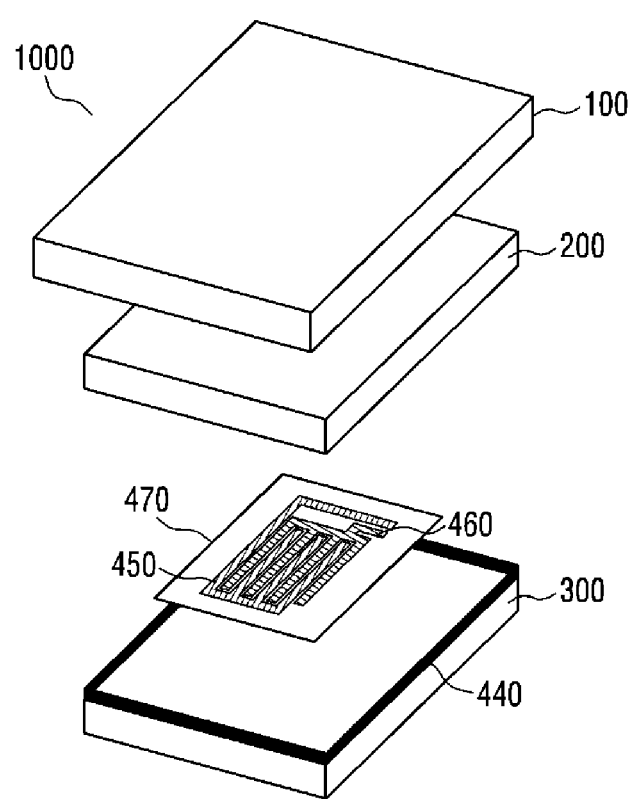
FIG. 5 is a perspective view of the touch input device according to the second embodiment of the present invention.

In FIGS. 4 and 5 and the description with reference to FIGS. 4 and 5, it is shown that as the touch input device 1000 according to the second embodiment of the present invention, the touch sensor panel 100 is laminated and attached on the display module 200 by means of an adhesive. However, the touch input device 1000 according to the second embodiment of the present invention may include, as shown in FIGS. 2b and 2c, that the touch sensor panel 100 is disposed inside the display module 200. More specifically, while FIGS. 4 and 5 show that the touch sensor panel 100 covers the display module 200, the touch input device 1000 which includes the touch sensor panel 100 disposed inside the display module 200 and includes the display module 200 covered with a cover layer like glass may be used as the second embodiment of the present invention.

The touch input device 1000 according to the embodiment of the present invention may include an electronic device including the touch screen, for example, a cell phone, a personal data assistant (PDA), a smart phone, a tablet personal computer, an MP3 player, a laptop computer, etc.

In the touch input device 1000 according to the embodiment of the present invention, a substrate 300, together with an outermost cover 320 of the touch input device 1000, functions as, for example, a housing which surrounds a mounting space 310, etc., where the circuit board and/or battery for operation of the touch input device 1000 are placed. Here, the circuit board for operation of the touch input device 1000 may be a main board. A central processing unit (CPU), an application processor (AP) or the like may be mounted on the circuit board. Due to the substrate 300, the display module 200 is separated from the circuit board and/or battery for operation of the touch input device 1000. Due to the substrate 300, electrical noise generated from the display module 200 can be blocked.

The touch sensor panel 100 or front cover layer of the touch input device 1000 may be formed wider than the display module 200, the substrate 300, and the mounting space 310. As a result, the cover 320 is formed such that the cover 320, together with the touch sensor panel 100, surrounds the display module 200, the substrate 300, and the mounting space 310.

The touch input device 1000 according to the second embodiment of the present may detect the touch position through the touch sensor panel 100 and may detect the touch pressure by disposing the pressure detection module 400 between the display module 200 and the substrate 300. Here, the touch sensor panel 100 may be disposed inside or outside the display module 200. The pressure detection module 400 is formed to include, for example, the spacer layer 420 consisting of the air gap. This will be described in detail with reference to FIGS. 5 to 7b. The spacer layer 420 may be made of an impact absorbing material in accordance with the embodiment. The spacer layer 420 may be filled with a dielectric material in accordance with the embodiment.

FIG. 5 is a perspective view of the touch input device according to the second embodiment of the present invention. As shown in FIG. 5, in the touch input device 1000 according to the embodiment of the present, the pressure detection module 400 may include the spacer layer 420 which leaves a space between the display module 200 and the substrate 300 and may include electrodes 450 and 460 disposed within the spacer layer 420. Hereafter, for the purpose of clearly distinguishing the electrodes 450 and 460 from the electrode included in the touch sensor panel 100, the electrodes 450 and 460 for detecting the pressure are designated as pressure electrodes 450 and 460. Here, since the pressure electrodes 450 and 460 are included in the rear side instead of in the front side of the display panel, the pressure electrodes 450 and 460 may be made of an opaque material as well as a transparent material.

Here, the adhesive tape 440 with a predetermined thickness may be formed along the border of the upper portion of the substrate 300 in order to maintain the spacer layer 420. While FIG. 5 shows the adhesive tape 440 is formed on the entire border (e.g., four sides of the quadrangle) of the substrate 300, the adhesive tape 440 may be formed only on at least some (e.g., three sides of the quadrangle) of the border of the substrate 300. According to the embodiment, the adhesive tape 440 may be formed on the top surface of the substrate 300 or on the bottom surface of the display module 200. The adhesive tape 440 may be a conductive tape in order that the substrate 300 and the display module 200 have the same electric potential. The adhesive tape 440 may be a double adhesive tape. In the embodiment of the present invention, the adhesive tape 440 may be made of an inelastic material. In the embodiment of the present invention, when a pressure is applied to the display module 200, the display module 200 may be bent. Therefore, the magnitude of the touch pressure can be detected even though the adhesive tape 440 is not transformed by the pressure.

Figure 6A:
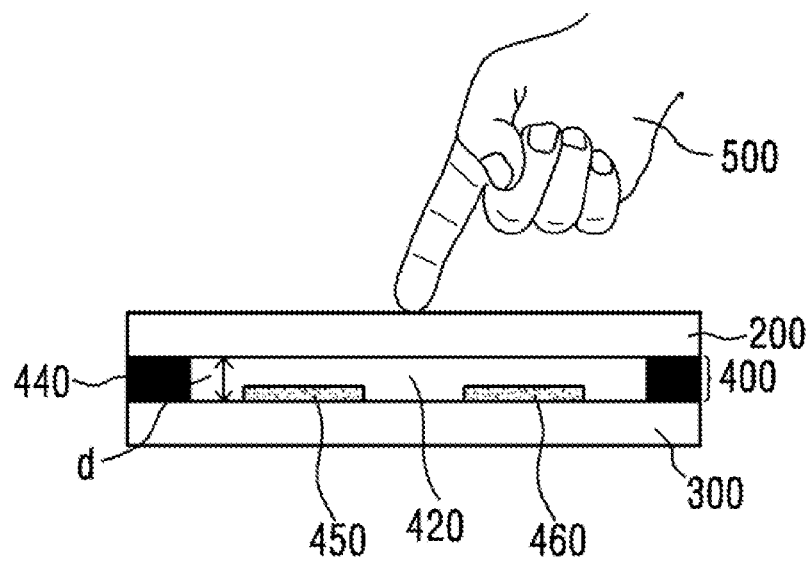
FIG. 6a is a cross sectional view of the touch input device including a pressure electrode pattern according to the first embodiment of the present invention.

FIG. 6a is a cross sectional view of the touch input device including a pressure electrode pattern according to the first embodiment of the present invention. As shown in FIG. 6a, the pressure electrodes 450 and 460 according to the first embodiment of the present invention may be formed within the spacer layer 420 and on the substrate 300.

The pressure electrode for detecting the pressure may include the first electrode 450 and the second electrode 460. Here, any one of the first and the second electrodes 450 and 460 may be a drive electrode and the other may be a receiving electrode. A driving signal is applied to the drive electrode, and a sensing signal may be obtained through the receiving electrode. When voltage is applied, the mutual capacitance may be generated between the first electrode 450 and the second electrode 460.

Figure 6B:
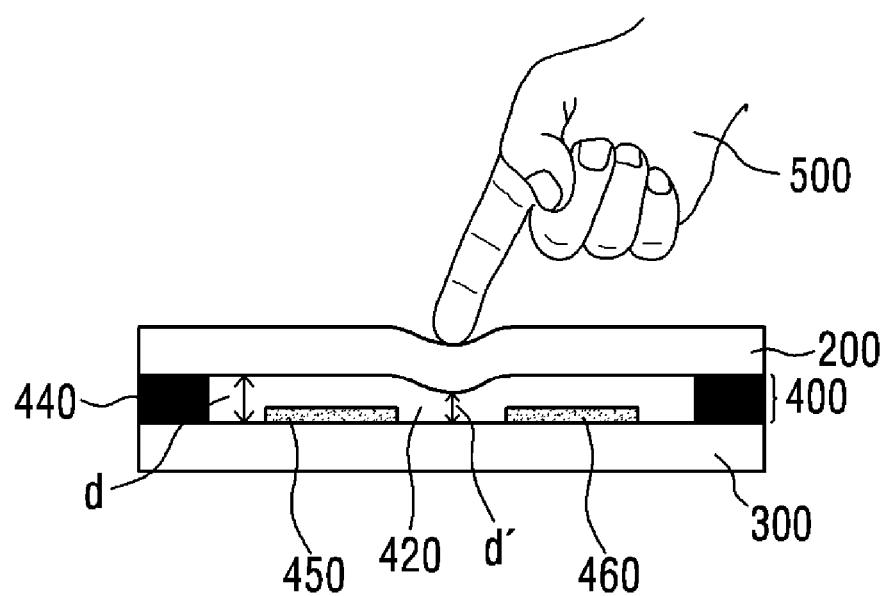

FIG. 6b is a cross sectional view showing a case where a pressure has been applied to the touch input device 1000 shown in FIG. 6a. The bottom surface of the display module 200 may have a ground potential so as to block the noise. When the pressure is applied to the surface of the touch sensor panel 100 by an object 500, the touch sensor panel 100 and the display module 200 may be bent. As a result, the distance "d" between the ground potential surface and the pressure electrode patterns 450 and 460 may be decreased to "d'". In this case, due to the decrease of the distance "d", the fringing capacitance is absorbed in the bottom surface of the display module 200, so that the mutual capacitance between the first electrode 450 and the second electrode 460 may be reduced. Therefore, the magnitude of the touch pressure can be calculated by obtaining the reduction amount of the mutual capacitance from the sensing signal obtained through the receiving electrode.

In the touch input device 1000 according to the embodiment of the present invention, the display module 200 may be bent by the touch pressure. The display module 200 may be bent in such a manner as to show the biggest transformation at the touch position. When the display module 200 is bent according to the embodiment, a position showing the biggest transformation may not match the touch position. However, the display module 200 may be shown to be bent at least at the touch position. For example, when the touch position approaches close to the border, edge, etc., of the display module 200, the most bent position of the display module 200 may not match the touch position, however, the display module 200 may be shown to be bent at least at the touch position.

Figure 8:
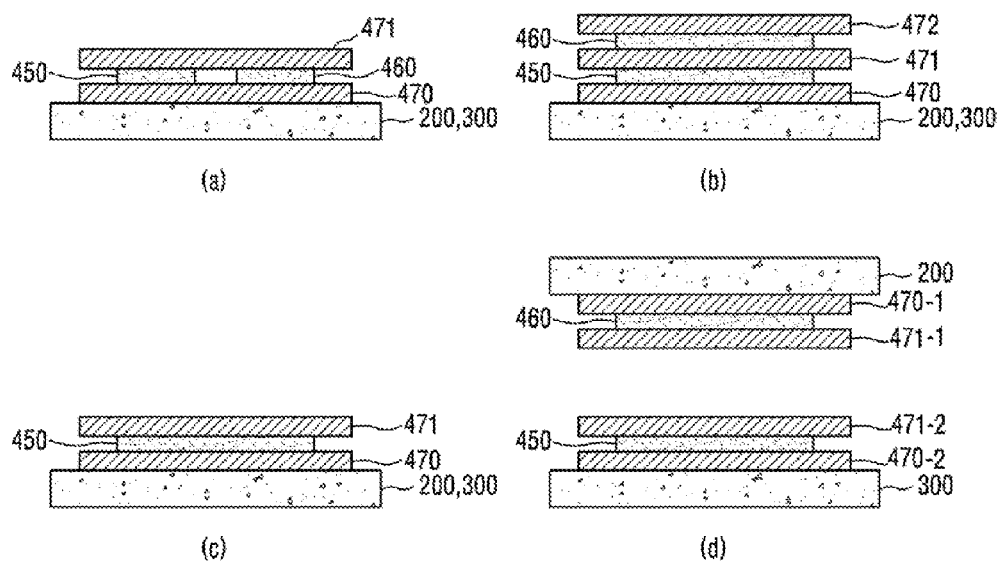
FIG. 8 shows an attachment structure of the pressure electrode according the embodiment of the present invention.

Here, the top surface of the substrate 300 may also have the ground potential in order to block the noise. Therefore, in order to prevent a short-circuit from occurring between the substrate 300 and the pressure electrodes 450 and 460, the pressure electrodes 450 and 460 may be formed on an insulation layer 470. FIG. 8 shows an attachment structure of the pressure electrode according the embodiment of the present invention. Referring to (a) of FIG. 8, the first insulation layer 470 is positioned on the substrate 300, and then the pressure electrodes 450 and 460 are formed. Also, according to the embodiment, the first insulation layer 470 on which the pressure electrodes 450 and 460 have been formed may be attached on the substrate 300. Also, the pressure electrode according to the embodiment may be formed by positioning a mask, which has a through-hole corresponding to the pressure electrode pattern, on the substrate 300 or on the first insulation layer 470 positioned on the substrate 300, and then by spraying a conductive material.

Also, when the bottom surface of the display module 200 has the ground potential, the pressure electrodes 450 and 460 may be covered with an additional second insulation layer 471 in order to prevent a short-circuit from occurring between the display module 200 and the pressure electrode 450 and 460 positioned on the substrate 300. Also, the pressure electrodes 450 and 460 formed on the first insulation layer 470 are covered with the additional second insulation layer 471 and then are integrally attached on the substrate 300, so that the pressure detection module 400 is formed.

The pressure electrode 450 and 460 attachment structure and method, which have been described with reference to (a) of FIG. 8, may be applied to the attachment of the pressure electrodes 450 and 460 to the display module 200. The attachment of the pressure electrodes 450 and 460 to the display module 200 will be described in more detail with reference to FIG. 6c.

Also, depending on the kind and/or implementation method of the touch input device 1000, the substrate 300 or the display module 200 on which the pressure electrodes 450 and 460 are attached may not have the ground potential or may have a weak ground potential. In this case, the touch input device 1000 according to the embodiment of the present may further include a ground electrode (not shown) between the first insulation layer 470 and either the substrate 300 or the display module 200. According to the embodiment, another insulation layer (not shown) may be included between the ground electrode and either the substrate 300 or the display module 200. Here, the ground electrode (not shown) is able to prevent the size of the capacitance generated between the first electrode 450 and the second electrode 460, which are pressure electrodes, from increasing excessively.

The above-described method for forming and attaching pressure electrode 450 and 460 can be applied in the same manner to the following embodiments.

Figure 6C:
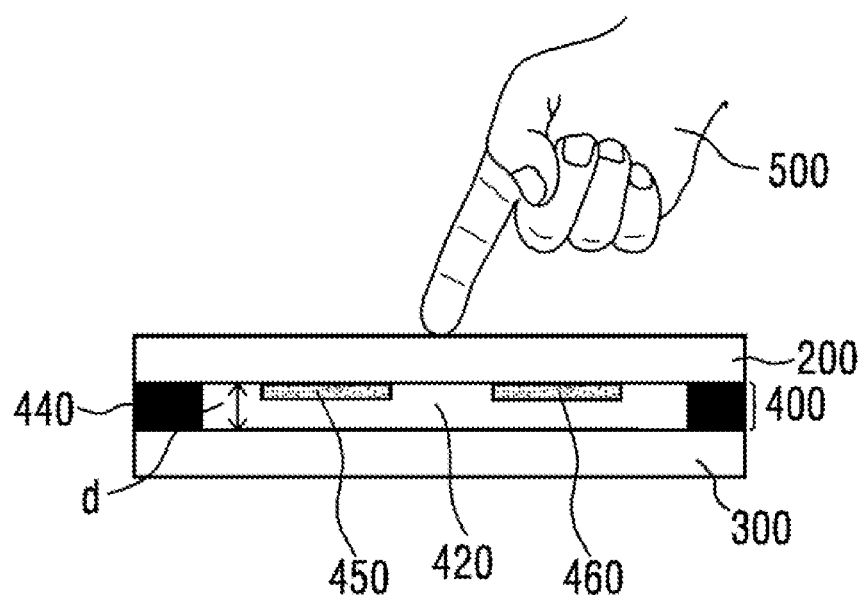
FIG. 6c is a cross sectional view of the touch input device including a pressure electrode pattern according to the second embodiment of the present invention.

FIG. 6c is a cross sectional view of the touch input device including a pressure electrode pattern according to the second embodiment of the present invention. While the first embodiment shows that the pressure electrodes 450 and 460 are formed on the substrate 300, the pressure electrodes 450 and 460 can be formed on the bottom surface of the display module 200. Here, the substrate 300 may have the ground potential. Therefore, the distance "d" between the substrate 300 and the pressure electrodes 450 and 460 is reduced by touching the touch surface of the touch sensor panel 100. Consequently, this may cause the change of the mutual capacitance between the first electrode 450 and the second electrode 460.

Figure 6D:
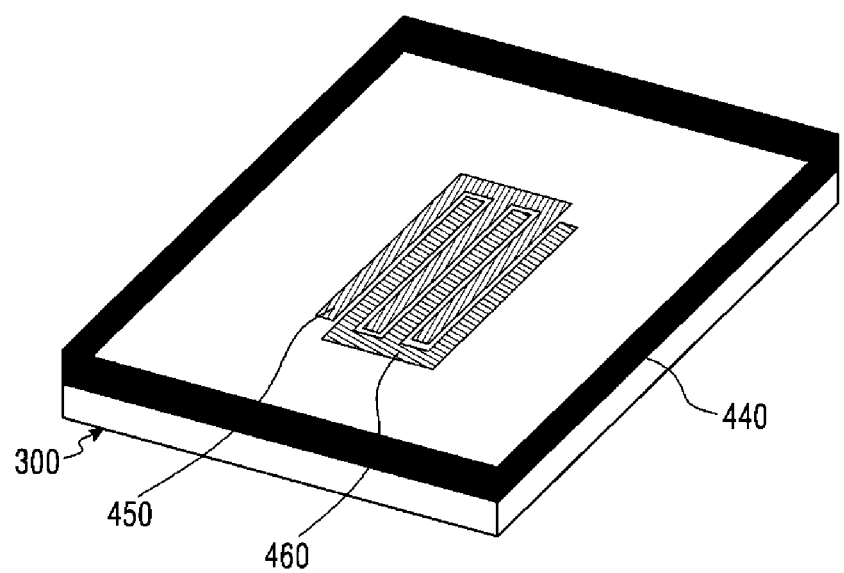
FIG. 6d shows the pressure electrode pattern according to the first embodiment of the present invention.

FIG. 6d shows the pressure electrode pattern according to the first embodiment of the present invention. FIG. 6d shows that the first electrode 450 and the second electrode 460 are formed on the substrate 300. The capacitance between the first electrode 450 and the second electrode 460 may be changed depending on the distance between the bottom surface of the display module 200 and the pressure electrode patterns 450 and 460.

Figure 6E:
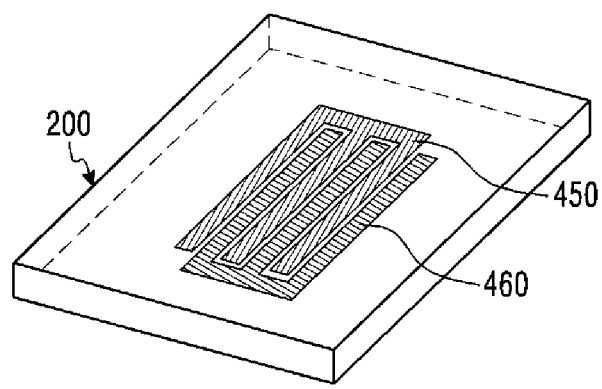
FIG. 6e shows the pressure electrode pattern according to the second embodiment of the present invention.

FIG. 6e shows the pressure electrode pattern according to the second embodiment of the present invention. FIG. 6e shows that the pressure electrode patterns 450 and 460 have been formed on the bottom surface of the display module 200.

Figure 6F:
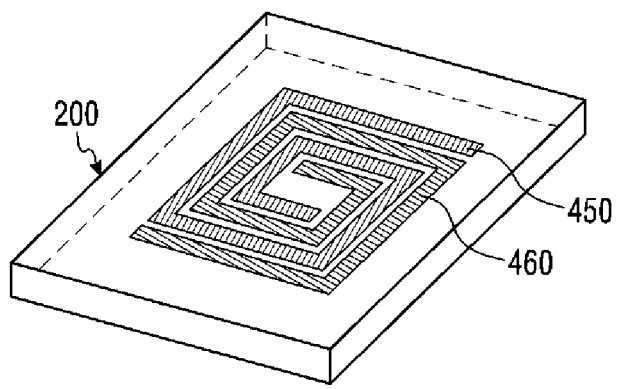
FIGS. 6f to 6g show pressure electrode patterns which can be applied to the embodiment of the present invention.
Figure 6G:
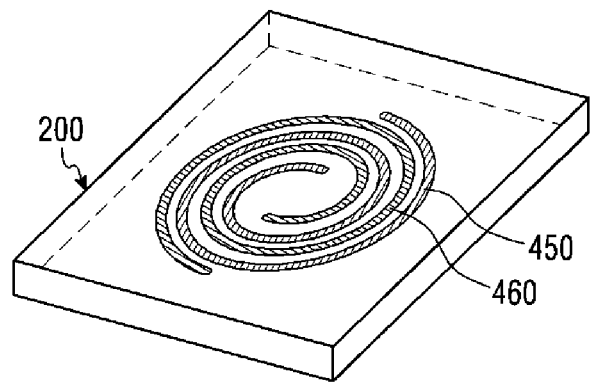

FIGS. 6f to 6g show pressure electrode patterns 450 and 460 which can be applied to the embodiment of the present invention. When the magnitude of the touch pressure is detected as the mutual capacitance between the first electrode 450 and the second electrode 460 is changed, it is necessary to form the patterns of the first electrode 450 and the second electrode 460 so as to generate the range of the capacitance required to improve the detection accuracy. With the increase of a facing area or facing length of the first electrode 450 and the second electrode 460, the size of the capacitance that is generated may become larger. Therefore, the pattern can be designed by adjusting the size of the facing area, facing length and facing shape of the first electrode 450 and the second electrode 460 in accordance with the range of the necessary capacitance. FIGS. 6f and 6g show that the first electrode 450 and the second electrode 460 are formed in the same layer, and show that the pressure electrode is formed such that the facing length of the first electrode 450 and the second electrode 460 becomes relatively longer.

The first and second embodiments show that the first electrode 450 and the second electrode 460 are formed in the same layer. However, it can be considered that the first electrode 450 and the second electrode 460 are formed in different layers in accordance with the embodiment. It is shown in (b) of FIG. 8 that an attachment structure in which the first electrode 450 and the second electrode 460 are formed in different layers. As shown in (b) of FIG. 8, the first electrode 450 may be formed on the first insulation layer 470, and the second electrode 460 may be formed on the second insulation layer 471 positioned on the first electrode 450. According to the embodiment, the second electrode 460 may be covered with a third insulation layer 472. Here, since the first electrode 450 and the second electrode 460 are disposed in different layers, they can be implemented so as to overlap each other. For example, the first electrode 450 and the second electrode 460 may be formed similarly to the pattern of the drive electrode TX and receiving electrode RX which are arranged in the form of M×N array and are included in the touch sensor panel 100 described with reference to FIG. 1. Here, M and N may be natural numbers greater than 1.

The first embodiment shows that the touch pressure is detected from the change of the mutual capacitance between the first electrode 450 and the second electrode 460. However, the pressure electrodes 450 and 460 may be configured to include only any one of the first electrode 450 and the second electrode 460. In this case, it is possible to detect the magnitude of the touch pressure by detecting the change of the capacitance between the one pressure electrode and the ground layer (either the display module 200 or the substrate 300).

For instance, in FIG. 6a, the pressure electrode may be configured to include only the first electrode 450. Here, the magnitude of the touch pressure can be detected by the change of the capacitance between the first electrode 450 and the display module 200, which is caused by the distance change between the display module 200 and the first electrode 450. Since the distance "d" is reduced with the increase of the touch pressure, the capacitance between the display module 200 and the first electrode 450 may be increased with the increase of the touch pressure. This can be applied in the same manner to the embodiment related to FIG. 6c. Here, the pressure electrode should not necessary have a comb teeth shape or a trident shape, which is required to improve the detection accuracy of the mutual capacitance change amount. The pressure electrode may have, as shown in FIG. 7b, a plate shape (e.g., quadrangular plate).

It is shown in (c) of FIG. 8c that an attachment structure in which the pressure electrode is formed to include only the first electrode 450. As shown in (c) of FIG. 8, the first electrode 450 may be formed on the first insulation layer 470 positioned on the substrate 300 or display module 200. Also, according to the embodiment, the first electrode 450 may be covered with the second insulation layer 471.

Figure 7A:
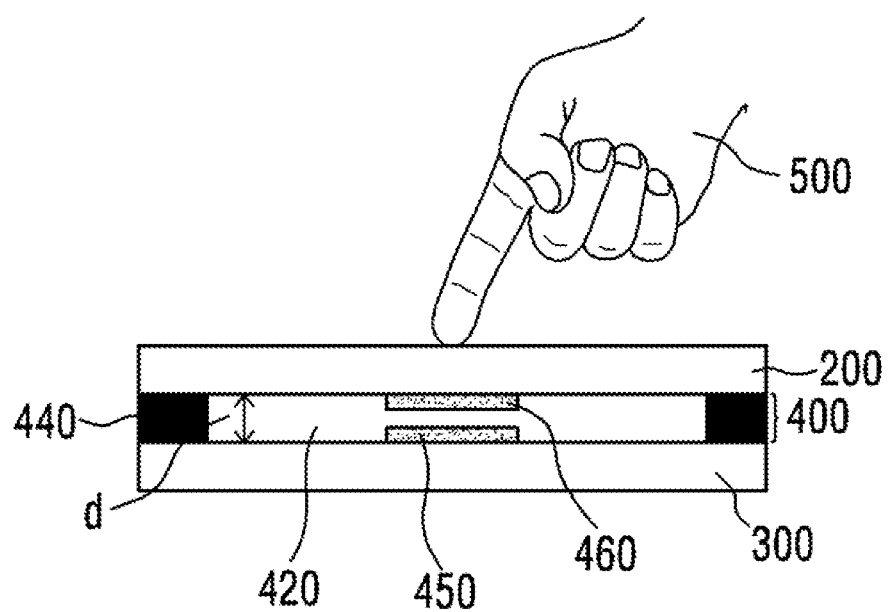
FIG. 7a is a cross sectional view of the touch input device including a pressure electrode pattern according to a third embodiment of the present invention.
Figure 7B:
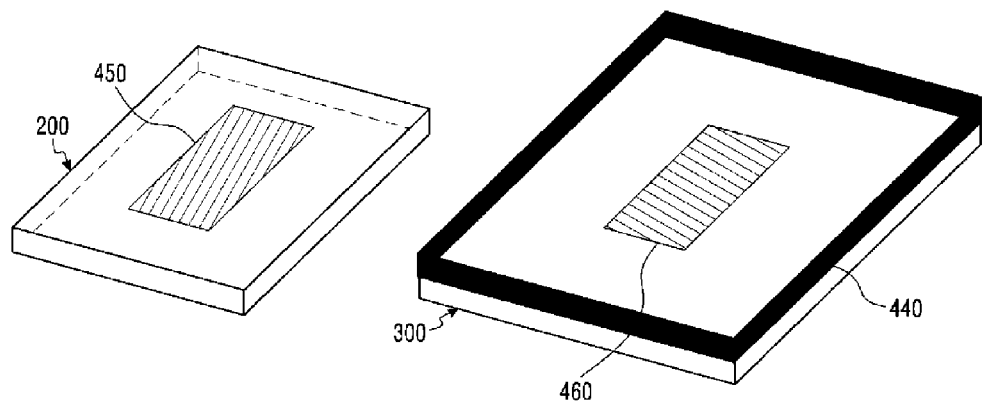
FIG. 7b shows the pressure electrode pattern according to the third embodiment of the present invention.

FIG. 7a is a cross sectional view of the touch input device including the pressure electrode pattern according to a third embodiment of the present invention. The pressure electrodes 450 and 460 according to the third embodiment may be formed within the spacer layer 420 and on the top surface of the substrate 300 and on the bottom surface of the display module 200.

The pressure electrode pattern for detecting the pressure may include the first electrode 450 and the second electrode 460. Here, any one of the first electrode 450 and the second electrode 460 may be formed on the substrate 300, and the other may be formed on the bottom surface of the display module 200. FIG. 7a shows that the first electrode 450 is formed on the substrate 300, and the second electrode 460 is formed on the bottom surface of the display module 200.

When the pressure is applied to the surface of the touch sensor panel 100 by the object 500, the touch sensor panel 100 and the display module 200 may be bent. As a result, the distance "d" between the first electrode 450 and the second electrode 460 may be reduced. In this case, the mutual capacitance between the first electrode 450 and the second electrode 460 may be increased with the reduction of the distance "d". Therefore, the magnitude of the touch pressure can be calculated by obtaining the increase amount of the mutual capacitance from the sensing signal obtained through the receiving electrode.

FIG. 7b shows the pressure electrode pattern according to the third embodiment of the present invention. FIG. 7b shows that the first electrode 450 is formed on the top surface of the substrate 300 and the second electrode 460 is formed on the bottom surface of the display module 200. As shown in FIG. 7b, since the pressure electrodes 450 and 460 are formed in different layers, the pressure electrodes 450 and 460 should not necessarily have a comb teeth shape or a trident shape unlike the first and second embodiments. The pressure electrodes 450 and 460 may have a plate shape (e.g., quadrangular plate).

It is shown in (d) of FIG. 8 that an attachment structure in which the first electrode 450 is attached on the substrate 300 and the second electrode 460 is attached to the display module 200. As shown in (d) of FIG. 8, the first electrode 450 may be positioned on the first insulation layer 470-2 formed on the substrate 300 and may be covered with the second insulation layer 471-2. Also, the second electrode 460 may be positioned on the first insulation layer 470-1 formed on the bottom surface of the display module 200 and may be covered with the second insulation layer 471-1.

As with the description related to (a) of FIG. 8, when substrate 300 or the display module 200 on which the pressure electrodes 450 and 460 are attached may not have the ground potential or may have a weak ground potential, a ground electrode (not shown) may be further included between the first insulation layers 470, 470-1, and 470-2 in (a) to (d) of FIG. 8. Here, an additional insulation layer (not shown) may be further included between the ground electrode (not shown) and either the substrate 300 or the display module 200 on which the pressure electrodes 450 and 460 are attached.

As described above, the touch input device 1000 according to the embodiment of the present invention senses the capacitance change occurring in the pressure electrodes 450 and 460. Therefore, it is necessary for the driving signal to be applied to the drive electrode out of the first and second electrodes 450 and 460, and it is required to detect the touch pressure by the capacitance change amount by obtaining the sensing signal from the receiving electrode. According to the embodiment, it is possible to additionally include the touch sensing IC for the operation of the pressure detection module 400. In this case, the touch input device repeatedly has a configuration similar to the configuration of FIG. 1 including the drive unit 120, sensing unit 110, and controller 130, so that the area and volume of the touch input device 1000 increase.

According to the embodiment, the pressure detection module 400 applies the driving signal for the operation of the touch sensor panel 100 through the touch detection device and receives the sensing signal, so that the touch pressure can be detected. Hereafter, the following description will be provided by assuming that the first electrode 450 is the drive electrode and the second electrode 460 is the receiving electrode.

For this, in the touch input device 1000 according to the embodiment of the present invention, the driving signal may be applied to the first electrode 450 from the drive unit 120, and the second electrode 460 may transmit the sensing signal to the sensing unit 110. The controller 130 may perform the scanning of the touch sensor panel 100, and simultaneously perform the scanning of the pressure detection module 400, or the controller 130 performs the time-sharing, and then may generate a control signal such that the scanning of the touch sensor panel 100 is performed in a first time interval and the scanning of the pressure detection module 400 is performed in a second time interval different from the first time interval.

Therefore, in the embodiment of the present invention, the first electrode 450 and the second electrode 460 should be electrically connected to the drive unit 120 and/or the sensing unit 110. Here, it is common that the touch detection device for the touch sensor panel 100 corresponds to the touch sensing IC 150 and is formed on one end of the touch sensor panel 100 or on the same plane with the touch sensor panel 100. The pressure electrode patterns 450 and 460 may be electrically connected to the touch detection device of the touch sensor panel 100 by any method. For example, the pressure electrode patterns 450 and 460 may be connected to the touch detection device through a connector by using the second PCB 210 included in the display module 200. For example, as shown in FIG. 5, the conductive traces 451 and 461 which electrically extend from the first electrode 450 and the second electrode 460 respectively may be electrically connected to the touch sensing IC 150 through the second PCB 210, etc.

Figure 9A:
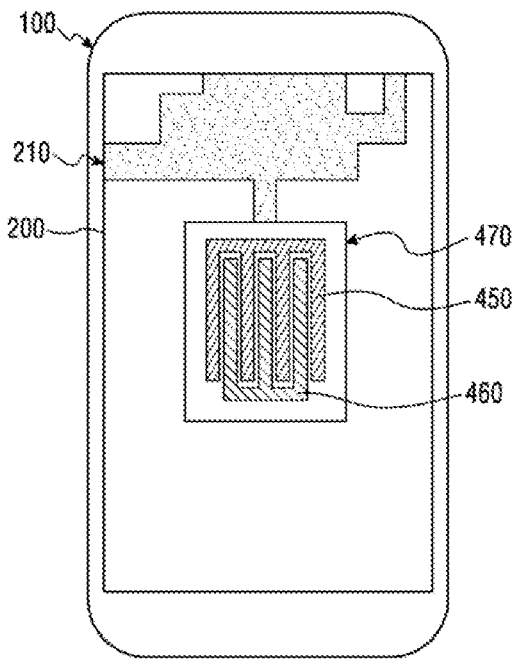
FIGS. 9a and 9b show an attachment method of the pressure electrode according the second embodiment of the present invention.
Figure 9B:
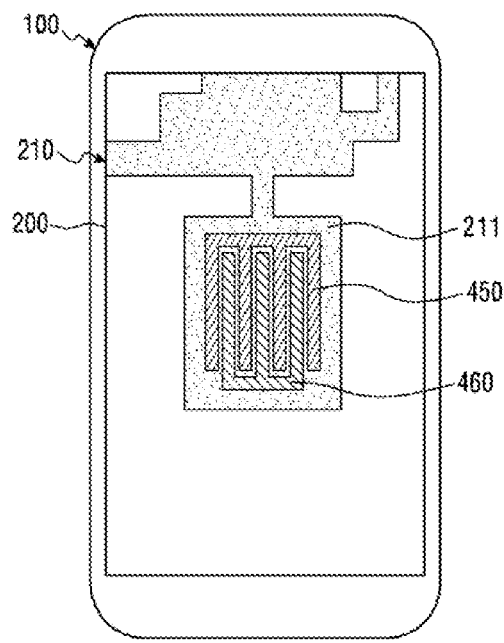

FIGS. 9a and 9b show an attachment method of the pressure electrode according the second embodiment of the present invention. FIGS. 9a and 9b show that the pressure electrodes 450 and 460 according to the embodiment of the present invention are attached to the bottom surface of the display module 200. FIGS. 9a and 9b show the second PCB 210 on which a circuit for the operation of the display panel has been mounted is disposed on a portion of the bottom surface of the display module 200.

FIG. 9a shows that the pressure electrode patterns 450 and 460 are attached to the bottom surface of the display module 200 such that the first electrode 450 and the second electrode 460 are connected to one end of the second PCB 210 of the display module 200. Here, FIG. 9a shows that the first electrode 450 and the second electrode 460 are manufactured on the insulation layer 470. The first electrode pattern 450 and the second electrode pattern 460 is formed on the insulation layer 470 and may be attached as an integral sheet on the bottom surface of the display module 200. A conductive pattern may be printed on the second PCB 210 in such a manner as to electrically connect the pressure electrode patterns 450 and 460 to a necessary component like the touch sensing IC 150, etc. The detailed description of this will be provided with reference to FIGS. 10a to 10c.

FIG. 9b shows that the pressure electrodes 450 and 460 are integrally formed on the second PCB 210 of the display module 200. For example, when the second PCB 210 of the display module 200 is manufactured, a certain area 211 is separated from the second PCB, and then not only the circuit for the operation of the display panel but also the pattern corresponding to the first electrode 450 and the second electrode 460 can be printed on the area 211. A conductive pattern may be printed on the second PCB 210 in such a manner as to electrically connect the first electrode 450 and the second electrode 460 to a necessary component like the touch sensing IC 150, etc.

Figure 10A:
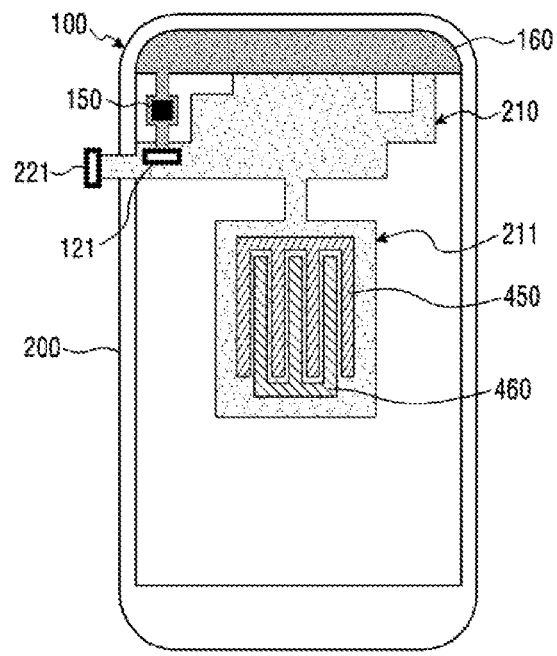
Figure 10B:
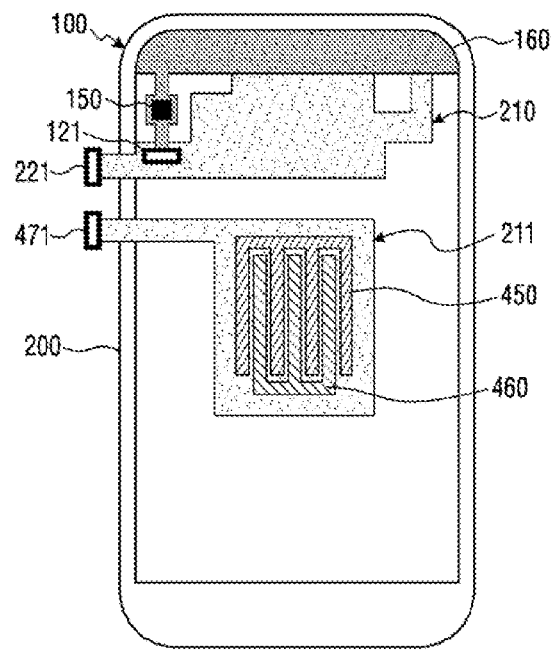

FIGS. 10a to 10c show how the pressure electrode is connected to the touch sensing IC 150 in accordance with the second embodiment of the present invention. In FIGS. 10a to 10c, the touch sensor panel 100 is included outside the display module 200. FIGS. 10a to 10c show that the touch detection device of the touch sensor panel 100 is integrated in the touch sensing IC 150 mounted on the first PCB 160 for the touch sensor panel 100.

FIG. 10a shows that the pressure electrodes 450 and 460 attached to the display module 200 are connected to the touch sensing IC 150 through a first connector 121. As shown in FIG. 10a, in a mobile communication device such as a smart phone, the touch sensing IC 150 is connected to the second PCB 210 for the display module 200 through the first connector 121. The second PCB 210 may be electrically connected to the main board through a second connector 221. Therefore, through the first connector 121 and the second connector 221, the touch sensing IC 150 may transmit and receive a signal to and from the CPU or AP for the operation of the touch input device 1000.

Here, while FIG. 10a shows that the first electrode 450 is attached to the display module 200 by the method shown in FIG. 9b, the first electrode 450 can be attached to the display module 200 by the method shown in FIG. 9a. A conductive pattern may be printed on the second PCB 210 in such a manner as to electrically connect the first electrode 450 and the second electrode 460 to the touch sensing IC 150 through the first connector 121.

FIG. 10b shows that the pressure electrodes 450 and 460 attached to the display module 200 are connected to the touch sensing IC 150 through a third connector 471. In FIG. 10b, the pressure electrodes 450 and 460 may be connected to the main board for the operation of the touch input device 1000 through the third connector 471, and in the future, may be connected to the touch sensing IC 150 through the second connector 221 and the first connector 121. Here, the pressure electrodes 450 and 460 may be printed on the additional PCB 211 separated from the second PCB 210. Otherwise, according to the embodiment, the pressure electrode patterns 450 and 460 may be formed on the insulation layer 470 and may be connected to the main board through the connector 471 by extending the conductive trace, etc., from the pressure electrodes 450 and 460.

FIG. 10c shows that the pressure electrode patterns 450 and 460 are directly connected to the touch sensing IC 150 through a fourth connector 472. In FIG. 10c, the pressure electrodes 450 and 460 may be connected to the first PCB 160 through the fourth connector 472. A conductive pattern may be printed on the first PCB 160 in such a manner as to electrically connect the fourth connector 472 to the touch sensing IC 150. As a result, the pressure electrodes 450 and 460 may be connected to the touch sensing IC 150 through the fourth connector 472. Here, the pressure electrodes 450 and 460 may be printed on the additional PCB 211 separated from the second PCB 210. The second PCB 210 may be insulated from the additional PCB 211 so as not to be short-circuited with each other. Also, according to the embodiment, the pressure electrodes 450 and 460 may be formed on the insulation layer 470 and may be connected to the first PCB 160 through the connector 472 by extending the conductive trace, etc., from the pressure electrodes 450 and 460.

The connection method of FIGS. 10b and 10c can be applied to the case where the pressure electrodes 450 and 460 are formed on the substrate 300 as well as on the bottom surface of the display module 200.

FIGS. 10a to 10c have been described by assuming that a chip on board (COB) structure in which the touch sensing IC 150 is formed on the first PCB 160. However, this is just an example. The present invention can be applied to the chip on board (COB) structure in which the touch sensing IC 150 is mounted on the main board within the mounting space 310 of the touch input device 1000. It will be apparent to those skilled in the art from the descriptions of FIGS. 10a to 10c that the connection of the pressure electrodes 450 and 460 through the connector can be also applied to another embodiment.

The foregoing has described the pressure electrodes 450 and 460, that is to say, has described that the first electrode 450 constitutes one channel as the drive electrode and the second electrode 460 constitutes one channel as the receiving electrode. However, this is just an example. According to the embodiment, the drive electrode and the receiving electrode constitute a plurality of channels respectively, so that a plurality of pressure detection can be made based on the multi-touch.

Figure 11B:
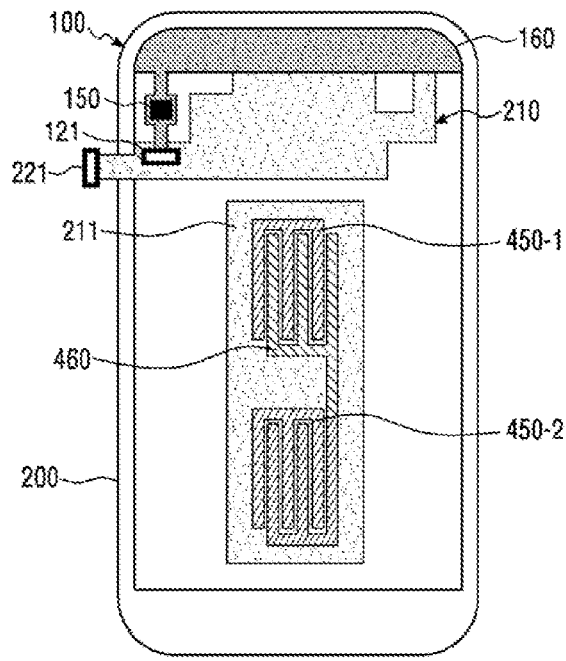
Figure 11C:
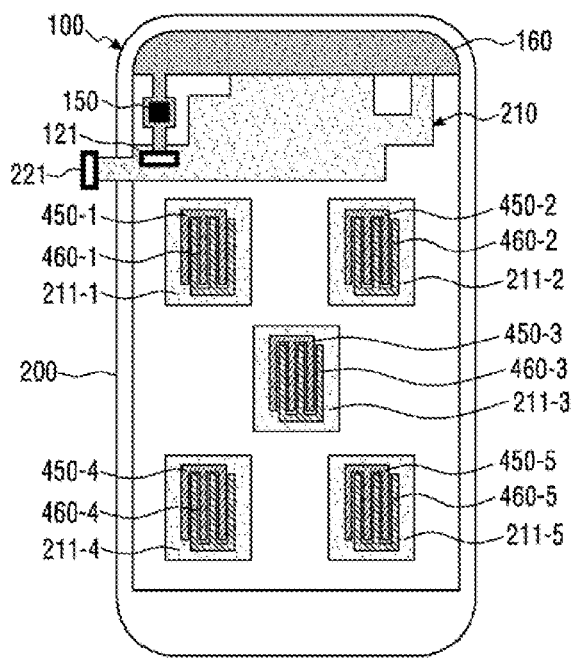

FIGS. 11a to 11c show that the pressure electrode according to the embodiment of the present invention constitutes the plurality of channels. FIG. 11a shows the first electrode 450-1 and 450-2 and the second electrode 460-1 and 460-2 constitute two channels respectively. FIG. 11b shows that the first electrode 450 constitutes two channels 450-1 and 450-2 and the second electrode 460 constitutes one channel. FIG. 11c shows the first electrode 450-1 to 450-5 and the second electrode 460-1 to 460-5 constitute five channels respectively.

FIGS. 11a to 11c show that the pressure electrode constitutes a single or a plurality of channels. The pressure electrode may be comprised of a single or a plurality of channels by a variety of methods. While FIGS. 11a to 11c do not show that the pressure electrodes 450 and 460 are electrically connected to the touch sensing IC 150, the pressure electrodes 450 and 460 can be connected to the touch sensing IC 150 by the method shown in FIGS. 10a to 10c and other methods.

Figure 12:
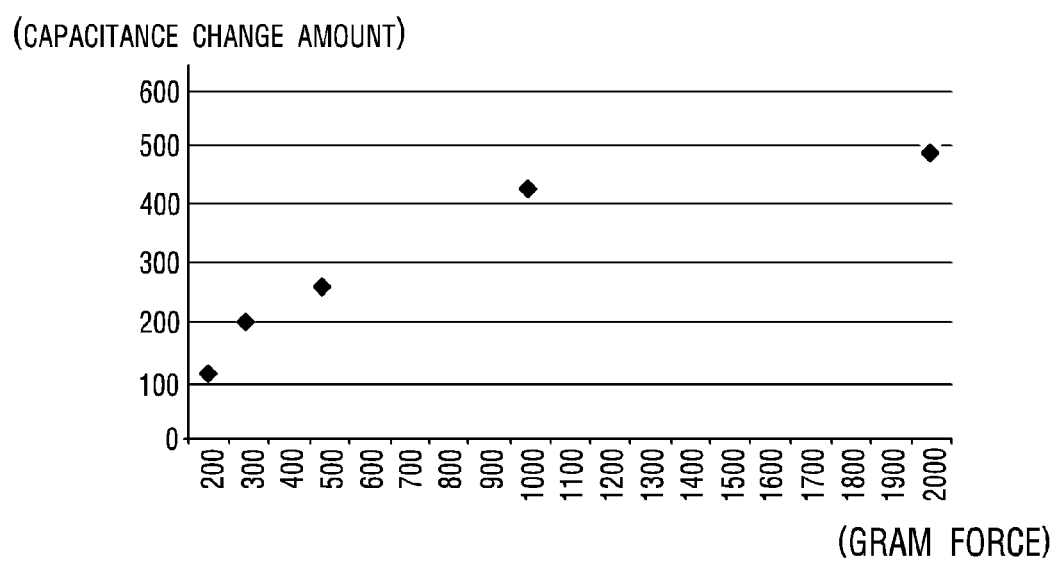
FIG. 12 is a graph that, when an experiment where the central portion of the touch surface of the touch input device 1000 according to the embodiment of the present invention is pressed by the non-conductive object is performed, represents a capacitance change amount according to a gram force of the object.

FIG. 12 is a graph that, when an experiment where the central portion of the touch surface of the touch input device 1000 according to the embodiment of the present invention is pressed by the non-conductive object is performed, represents a capacitance change amount according to a gram force of the object. As shown in FIG. 12, the greater the force which is applied to the central portion of the touch surface of the touch input device 1000 according to the embodiment of the present invention, the greater the capacitance change amount of the pressure electrode patterns 450 and 460 included in the pressure detection module 400.

The foregoing has described the capacitance type detection module as the pressure detection module 400. However, so long as the spacer layer 420 and the pressure electrodes 450 and 460 are used as the pressure detection module 400, the touch input device 1000 according to the embodiment of the present is able to use any type pressure detection module.

The features, structures and effects and the like described in the embodiments are included in one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:
1. A smartphone comprising:
a cover layer;
an organic light emitting display module which is located under the cover layer;
a pressure sensor comprising a pressure electrode formed as a sheet, wherein the pressure sensor is attached under the display module;
a shielding member for separating a circuit board or a battery from the display module, the shielding member located under the display module and spaced apart from the display module by a supporting structure located only in an edge portion of the shielding member, the edge portion not having the pressure electrode formed thereon; and
a plurality of drive electrodes to which a driving signal is applied and a plurality of receiving electrodes outputting a sensing signal used to detect a touch position;
wherein the shielding member is a reference potential layer;
wherein a magnitude of a touch pressure is detected based on a capacitance which is detected from the pressure electrode and is changed according to a distance between the pressure electrode and the reference potential layer; and
wherein the display module is bent by the touch, and wherein the capacitance detected from the pressure electrode changes as the display module bends.
2. The smartphone of claim 1, wherein, when the pressure sensor is attached under the display module, the pressure sensor further comprises an insulation layer located between the display module and the pressure electrode.

3. The smartphone of claim 1, wherein, when the pressure sensor is attached under the display module, the pressure electrode contacts and is attached to the bottom of the display module.

4. The smartphone of claim 1, wherein the display module comprises a polarizer layer, a first glass layer, and a second glass layer, which are disposed in the order listed, and comprises an organic light emitting material between the first glass layer and the second glass layer.

5. The smartphone of claim 4, wherein the plurality of drive electrodes and the plurality of receiving electrodes are located between the polarizer layer and the first glass layer.

6. The smartphone of claim 1, wherein the pressure electrode comprises a plurality of electrodes constituting a plurality of channels.

7. The smartphone of claim 1, wherein the cover layer is made of glass.

8. A smartphone comprising:
a cover layer;
an organic light emitting display module which is located under the cover layer;
a shielding member which is located under the display module and is spaced apart from the display module by a supporting structure located only in an edge portion of the shielding member;
a pressure sensor comprising a pressure electrode formed as a sheet, wherein the pressure sensor is attached on the shielding member, and wherein the edge portion of the shielding member does not have the pressure electrode formed thereon; and
a plurality of drive electrodes to which a driving signal is applied and a plurality of receiving electrodes outputting a sensing signal used to detect a touch position;
wherein the display module is a reference potential layer;
wherein a magnitude of a touch pressure is detected based on a capacitance which is detected from the pressure electrode and is changed according to a distance between the pressure electrode and the reference potential layer; and
wherein the display module is bent by the touch, and wherein the capacitance which is detected from the pressure electrode changes as the display module bends.

9. The smartphone of claim 8, wherein the display module comprises a polarizer layer, a first glass layer, and a second glass layer, which are disposed in the order listed, and comprises an organic light emitting material between the first glass layer and the second glass layer.

10. The smartphone of claim 9, wherein the plurality of drive electrodes and the plurality of receiving electrodes are located between the polarizer layer and the first glass layer.

11. The smartphone of claim 8, wherein, when the pressure sensor is attached on the shielding member, the pressure sensor further comprises an insulation layer located between the shielding member and the pressure electrode.

12. The smartphone of claim 8, wherein, when the pressure sensor is attached on the shielding member, the pressure electrode contacts and is attached to the top of the shielding member.

13. The smartphone of claim 8, wherein the pressure electrode comprises a plurality of electrodes constituting a plurality of channels.

14. The smartphone of claim 8, wherein the cover layer is made of glass.

* * * * *